UNITED STATES PATENT OFFICE.

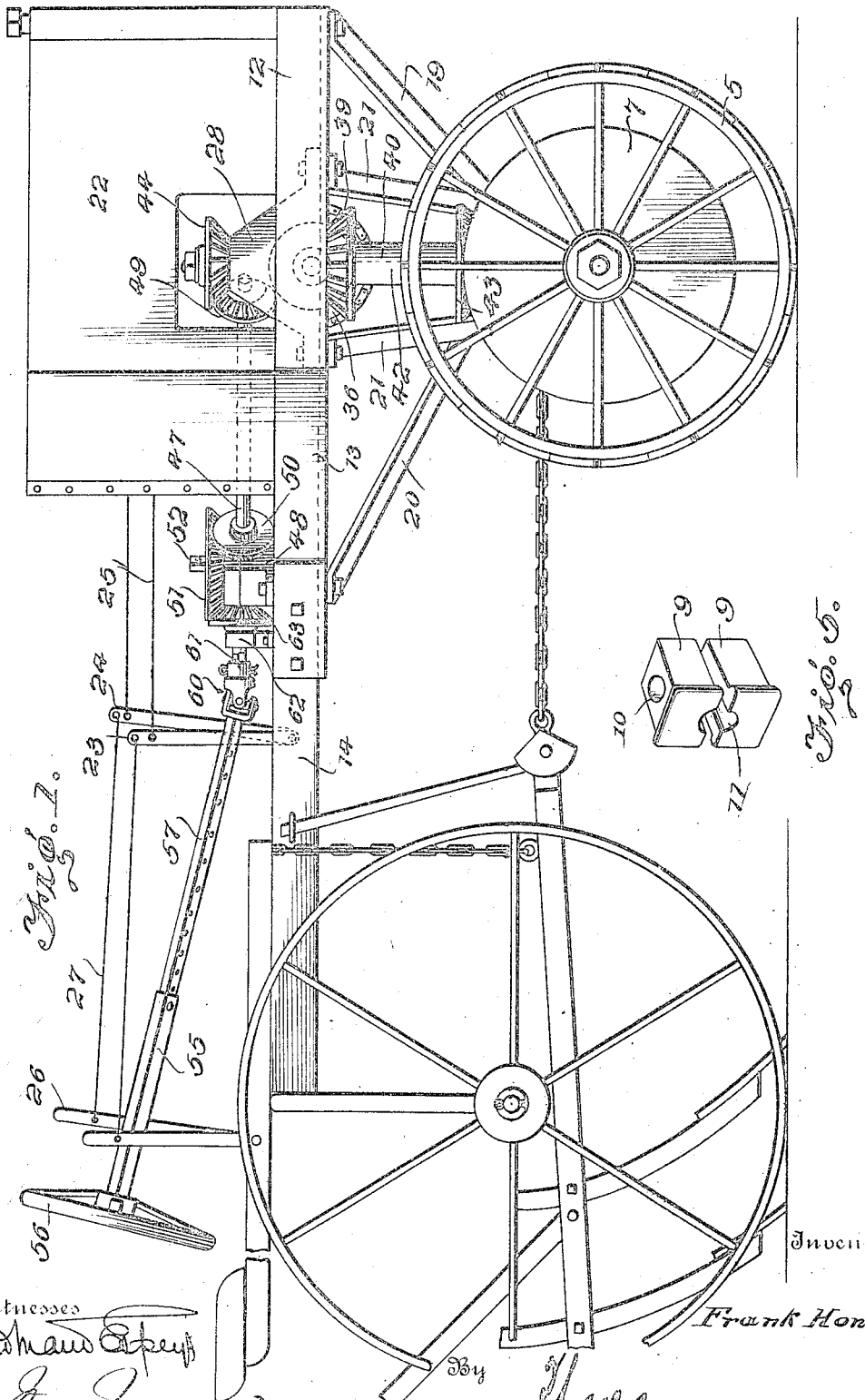

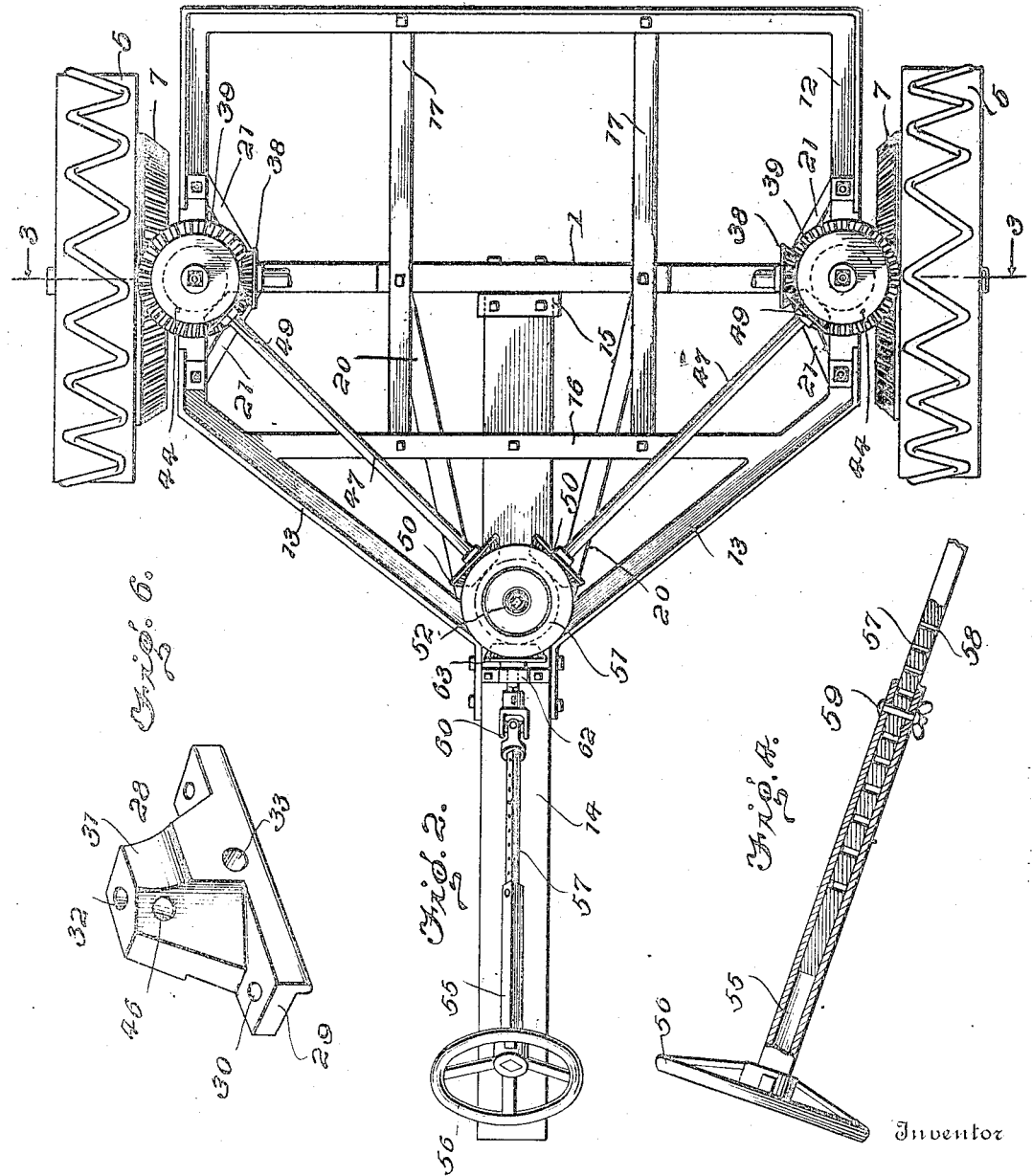

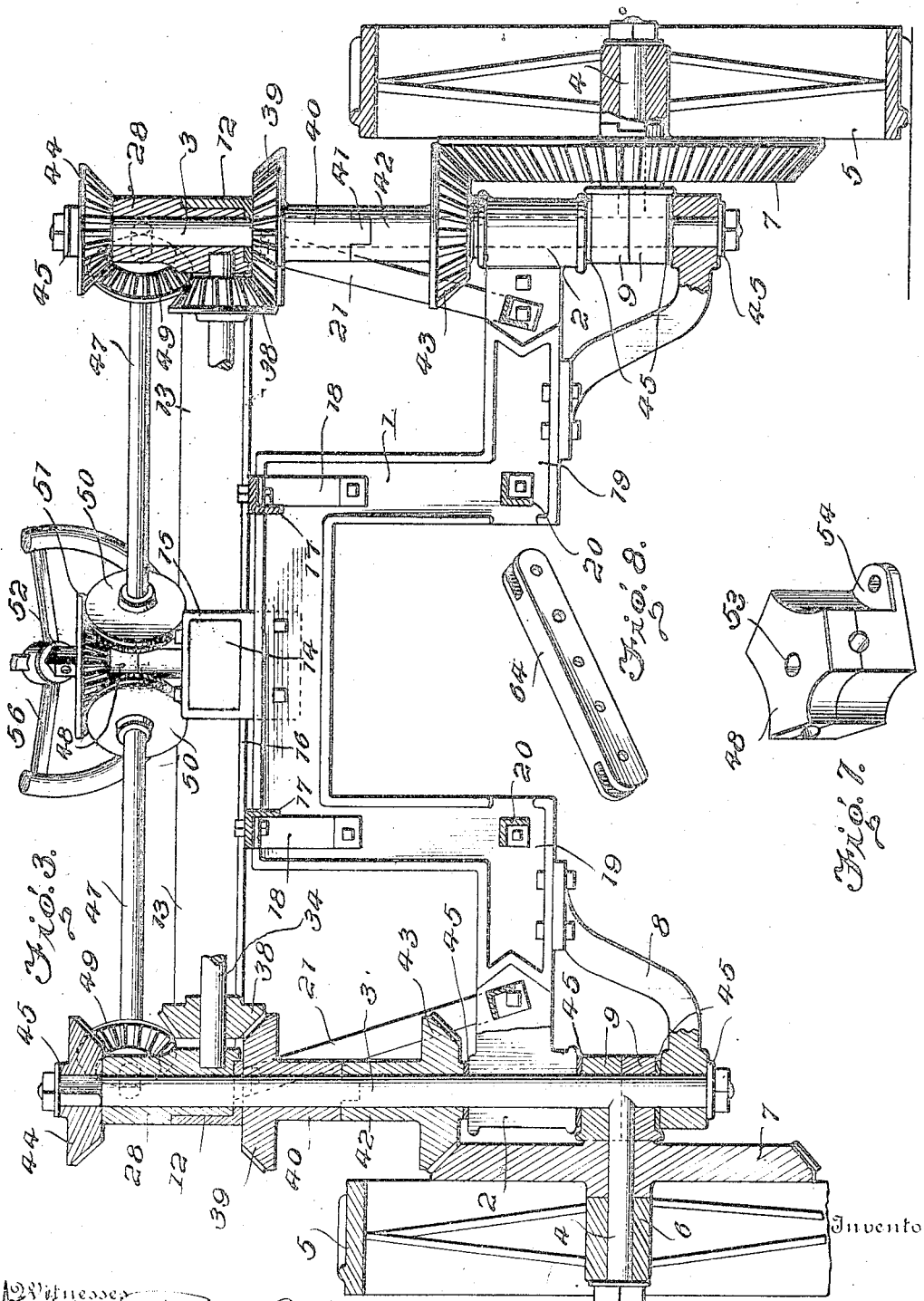

FRANK HONNOLD, OF CLIMBING HILL, IOWA, ASSIGNOR OF ONE-THIRD TO IRA VERMILYEA, OF CLIMBING HILL, IOWA.

TRACTOR.

1,130,285.  Specification of Letters Patent.  Patented Mar. 2, 1915.

Application filed March 7, 1913. Serial No. 752,723.

*To all whom it may concern:*

Be it known that I, FRANK HONNOLD, citizen of the United States, residing at Climbing Hill, in the county of Woodbury and State of Iowa, have invented certain new and useful Improvements in Tractors, of which the following is a specification.

This invention relates to a tractor which may be readily coupled to an agricultural implement, farm wagon, or other vehicle and utilized to pull the same.

A particular object of the present invention is to so improve the arrangement of the parts of the tractor that it may be easily steered and caused to turn sharp corners without employing the usual complicated systems of gearing.

A further object of the invention is to provide a tractor by which the draft will be applied directly to the vehicle or implement to which the tractor is coupled.

A further object of the invention is to provide a tractor of simple construction which will readily support an engine of any desired power and weight and which will travel over a field without injuring young plants and respond quickly to the steering wheel.

These several stated objects, and such other incidental objects as will appear from the following description, are attained in a tractor such as is illustrated in the drawings, and the invention consists in certain novel features which will be particularly pointed out in the claims following the description.

In the drawings: Figure 1 is a side elevation of the improved tractor coupled to a wheeled cultivator; Fig. 2 is a plan view of the tractor; Fig. 3 is a transverse sectional elevation, the sectional portion being shown on the line 3—3 of Fig. 2; Fig. 4 is a detail sectional view of the steering post; Fig. 5 is a detail view of the supports for the axle and its spindle; Fig. 6 is a detail perspective view of the bearing block for the upper portion of the spindle and the driving and steering shafts; Fig. 7 is a detail perspective view of the bearing block upon the tongue; Fig. 8 is a detail perspective view of a draw bar which may be sometimes used.

In carrying out my invention, I employ an arched beam 1 which serves as the connection between the axle spindles and as the main support of the frame and has secured to its opposite ends half sleeves 2 which encircle the spindles 3 which are formed integral with and at right angles to the axles 4. The traction wheels 5 are fitted upon the axles 4 and are held thereon by the usual dust-caps and lock-nuts, as will be readily understood. Rigid with the hub 6 of the traction wheel is a beveled gear wheel 7 through which power is imparted to the wheel to rotate the same in the operation of the tractor. The lower end of the spindle 3 passes through a brace 8 which is bolted to the arched cross bar 1 at the end of the arched portion thereof and between the sleeves 2 and the end of the brace 8 collars or blocks 9 are fitted. These blocks 9 are provided with vertical openings 10 and in their opposed faces have notches or grooves 11 whereby the blocks may be fitted upon the spindles 3 and engage the axles 4 extending therefrom so as to fill the space between the sleeves 2 and the braces 8, with the outer flat ends of the blocks bearing against the inner face of the gear wheel 7. The blocks, consequently, serve to prevent the gear wheel and the traction wheel moving axially inward, and, at the same time, if the spindle be rotated, the gear wheel and the traction wheel will be positively swung to an angle with the longitudinal axis of the tractor so that the tractor will be caused to turn to one side. The main frame 12 of the tractor is formed of angle bars and is substantially rectangular in plan view with rearwardly converging portions 13 which are bolted to opposite sides of the tongue 14, the front end of the tongue being secured in a socket 15 which is rigidly secured to the arched portion of the bar or beam 1 at the apex of the same, as will be readily understood. Between the converging portions 13 of the main frame is a cross bar 16, and longitudinal sills or beams 17 are secured to the said cross bar and to the front bar of the frame, as shown most clearly in Fig. 2. Where these longitudinal beams or sills 17 pass over the arched frame 1 they are connected with the same by brackets 18 which are bolted to the beams or sills and to the arch of the cross bar, as shown clearly in Fig. 3, and braces 19 have their rear ends bolted to the bar or frame 1 at the ends of the arch and extend upwardly therefrom to the front side of the main frame, as shown most clearly in Fig. 1. Braces 20 are secured at their lower ends to the rear face of the main bar 1 and extend rearwardly therefrom to the tongue 14 to which they are rigidly secured. Other braces 21 are secured to the arched frame by the same bolts that secure the sleeves 2 thereto and extend upwardly therefrom in front and in rear thereof and are secured to the side bars of the main frame 12. This construction of the frame enables it to support a heavy engine of high power and avoids unnecessary weight.

The engine is supported upon the front cross bar of the main frame and the front portions of the beams or sills 17 and is inclosed within a casing or hood 22 in the usual manner. The levers 23 and 24 for controlling the clutch and regulating the speed are mounted upon the tongue 14 and connected to the working parts of the engine by rods 25 in the usual manner, the said rods extending through the front side of the casing or hood 22, as will be readily understood. If the tractor is coupled to an implement which will be located close to the main frame of the tractor, the levers 23 and 24 may be manipulated directly from the operator's seat, but, if the implement to which the tractor is coupled is of such a type as to bring the operator's seat at a point more remote from the said levers, additional levers, shown at 26, may be employed and coupled to the levers 23 and 24 by rods 27. The wheeled cultivator or shovel plow shown in Fig. 1 will require the supplemental levers and connecting rods, but in many instances they may be dispensed with.

Secured upon the sides of the main frame by the same bolts that secure the braces 21 thereto are journal boxes 28 which are constructed with bases 29 to rest upon the side bar and are provided with openings 30 through their ends to receive the securing bolts. Rising centrally from the said bases are sleeves or columns 31 which are also provided with central openings 32 whereby the journal box may fit around the spindle 3, as will be readily understood on reference to Fig. 3. Near its base, in one side, a socket 33 is formed in the box to receive the end of a shaft indicated at 34 which carries a bevel pinion 38 and may be operatively connected in any convenient or preferred manner with the engine, a pinion 38 being provided at each side of the machine. The pinions 38 mesh with beveled gears 39 having elongated hubs 40 and fitted loosely upon the spindles 3. The said hubs 40 are provided with lugs 41 at their lower ends which engage correspondingly formed notches in the upper ends of hubs 42 rising from bevel gears 43 which mesh with the gear wheels 7. It will thus be seen that motion may be transmitted from the engine to the gear wheels 7 so that the traction wheels will be rotated and the tractor will travel over the ground. It will be readily noted that as the spindles 3 form the axes for the gear wheels 39 and 43, if the spindles be rotated, the axles 4 will be swung forwardly or rearwardly without disconnecting the gears 43 from the gears 7 so that the machine may be turned to either side without arresting its travel.

To rotate the spindles 3, and thereby effect steering of the tractor, I fit upon the upper extremity of each spindle a bevel gear wheel 44 which has an angular engagement with the spindle so that rotation of the gear wheel will be transmitted directly to the spindle, and a suitable retaining nut is, of course, mounted on the upper end of the spindle and turned home against the hub of the gear wheel to maintain the engagement of the parts. Washers 45 are placed around the spindle between the retaining nuts at the ends of the same and the adjacent parts and also between the blocks 9 and the parts immediately adjacent thereto and the gear wheels 43 and the sleeves 2, thereby reducing the wear on the essential parts of the mechanism. The boxes 28 are provided near their upper ends with sockets 46 in which are fitted the front ends of shafts 47 which converge rearwardly and have their rear ends mounted in a bearing block 48 secured upon the tongue 14. The shafts 47 are equipped with bevel pinions 49 at their front ends meshing with the bevel gear wheels 44 and at their rear ends these shafts 47 are equipped with bevel pinions 50 which mesh with a horizontally disposed master gear 51 having an angular engagement with a pin or shaft 52 journaled in the central vertical opening 53 of the block 48 and retained in position by a suitable nut or its equivalent fitted on the lower end of the pin or shaft and bearing against the under side of the tongue. The upper end of the head of the pin or shaft 52 is angular, as clearly shown, so that, if the steering post be disposed vertically as when the tractor is coupled to a hay wagon or ordinary farm wagon, the said post may engage the head of the said shaft or pin and thereby rotate the master wheel 51 to transmit motion to the steering shafts 47 and turn the spindles 3 through the described gearing, as will be readily understood. The bearing block 48 is substantially triangular in plan view and is equipped with lugs or flanges 54 through which the bolts securing the front ends of the braces 20 may pass to secure the said braces and the boxes to the tongue.

In the more usual use of the tractor, the steering post will extend longitudinally rearwardly above the tongue and the said post is composed of a rear or outer member 55 having the usual steering wheel 56 at its rear end and receiving an inner member or angular bar 57 which is provided with a longitudinal series of perforations 58 through any one of which the fastening bolt 59 may be inserted in order to adjust the steering bar to the particular implement to which the tractor is coupled. The front end of the inner member 57 of the steering post is connected by a universal joint 60 with a short shaft 61 journaled in a suitable box or bearing 62 on the upper side of the tongue and equipped at its front end with a bevel pinion 63 meshing with the master wheel 51, as shown. It will thus be seen that if the steering post be rotated the master gear wheel 51 will be actuated and the movement of the master wheel will be transmitted directly to the pinions 50 so that the shafts 47 and the pinions 49 thereon will be rotated. As the pinions 49 are in mesh with the bevel gears 44, the said gears will be actuated and the spindles 3 will be turned so that one axle 4 will be swung either forwardly or rearwardly and the other axle will be swung in the opposite direction so that the traction wheels will both be turned to an angle with the main frame, while preserving their parallelism and, consequently, the tractor may be quickly turned to one side and steered around sharp curves or corners.

It is thought the use and advantages of the tractor will be readily understood from the foregoing description, taken in connection with the accompanying drawings. The tongue 14 of the tractor is coupled to the tongue or running gear of the wagon or agricultural implement which is to be drawn, and any ordinary form of clip may be utilized for this purpose. If a very heavy load is to be drawn, a cross bar 64 may be bolted to the ends of the arch of the main cross bar 1 and chains or other draft devices attached to the said draw-bar and to the vehicle, as will be readily understood. The tractor having been coupled to the agricultural implement, the wagon, or other portable machine, the engine is started and power transmitted through intermediate gearing to the traction wheels so that the said traction wheels will be rotated and the apparatus caused to travel over the ground. As the engine is supported in advance of the axle, its weight will tend to counter-balance the weight of the machine to which the tractor is attached so that the power will be utilized economically and will not be wasted in preserving the balance of the tractor and the machine will travel smoothly and easily and respond quickly to the steering mechanism. Inasmuch as the spindles which effect the steering are also the centers about which the driving gears rotate, the parts are arranged very compactly and the traction wheels may be easily and quickly turned so as to cause the tractor to travel around sharp curves or corners.

It will be noted that the driving wheels are also the steering wheels so that the tractor needs only a single pair of wheels and a short coupling will connect the machine to be propelled with the power to propel it. The arched form of the main beam or cross bar enables the tractor to clear young plants and the draft is not so heavy as to pack the earth at the sides of the rows.

What I claim is:—

1. In a tractor, the combination of a cross bar, traction wheels supporting said bar, a frame disposed above said bar, a tongue secured to said bar and extending rearwardly therefrom and secured to the frame and braces extending from the said cross-bar to the frame at the sides and at the front thereof.

2. In a tractor, the combination of a frame, spindles mounted vertically in the frame, axles rigid with the spindles and extending laterally therefrom, traction wheels mounted upon the axles, gears rigid with the upper ends of the spindles, rearwardly converging steering shafts mounted on the frame and equipped at their forward ends with pinions meshing with the gears on the spindles, pinions at the rear ends of the steering shafts, a master gear mounted at the rear of the frame and meshing with said pinions, and means for rotating said master gear.

3. In a tractor, the combination of a frame, spindles mounted vertically in the frame, axles rigid with the spindles and extending laterally therefrom, traction wheels mounted on the axles, gears rigid with the upper ends of the spindles, rearwardly converging steering shafts mounted on the frame, pinions at the front ends of said shafts meshing with the gears at the upper ends of the spindles, pinions on the rear end of said shafts, a master gear meshing with said pinions, a steering post mounted in rear of the master gear, and a pinion on the front end of the steering post meshing with the master gear.

4. In a tractor, the combination of a cross bar, a brace secured to and diverging downwardly from the cross bar, a spindle mounted vertically in the cross bar and the brace, an axle rigid with and extending laterally from the spindle between the cross bar and the brace, filling blocks fitted around the axle and the spindle between the cross bar and the brace, a traction wheel on the axle, and means for turning the spindle.

5. In a tractor, the combination of a frame, a tongue extending rearwardly therefrom, traction wheels supporting the frame, a master gear disposed horizontally on the tongue, steering shafts on the frame, gearing between said shafts and the traction wheels, pinions on said shafts meshing with the master gear, and means for rotating said master gear.

6. In a tractor, the combination of a frame, boxes secured on the frame, spindles mounted in the frame below the boxes and journaled in and extending vertically through said boxes, a main shaft having its ends journaled in the inner sides of said boxes, wheels supporting the frame, gearing carried by the spindles to connect the wheels and the main shaft to rotate the wheels, steering shafts mounted on the frame and having their front ends journaled in the rear sides of said boxes, means for simultaneously rotating said steering shafts, pinions on said steering shafts adjacent said boxes, and pinions fixed on the upper ends of the spindles and meshing with said pinions on the steering shafts.

7. A tractor comprising a main beam, traction wheels mounted at the ends of said beam, a frame secured upon said beam and projecting in advance of the same to support a motor, a tongue secured to and projecting rearwardly from the beam, and steering mechanism supported by the tongue and the rear portion of the frame.

8. A tractor comprising an arched beam, sills secured to and projecting forwardly and rearwardly from said beam, a tongue having its front end secured to said beam, a main frame secured to the front and rear ends of the sills and having rearwardly converging portions secured to the tongue, braces extending from the arched beam to the front of the frame, braces extending from the arched beam to the tongue, braces extending from the ends of the beam to the sides of the frame, spindles mounted in the ends of the beam and the sides of the frame, traction wheels carried by said spindles, and means supported by the tongue and the rear portion of the frame to rotate the spindles and steer the traction wheels.

In testimony whereof I affix my signature in presence of two witnesses.

FRANK HONNOLD. [L. S.]

Witnesses:
W. L. FULTON,
IRA VERMILYEA.

Copies of this patent may be obtained for five cents each, by addressing the "Commissioner of Patents, Washington, D. C."